United States Patent
Gavrilets

(10) Patent No.: US 11,499,827 B2
(45) Date of Patent: Nov. 15, 2022

(54) MULTI-AIRCRAFT VISION AND DATALINK BASED NAVIGATION SYSTEM AND METHOD

(71) Applicant: Rockwell Collins, Inc., Cedar Rapids, IA (US)

(72) Inventor: Vladislav Gavrilets, McLean, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 218 days.

(21) Appl. No.: 16/436,288

(22) Filed: Jun. 10, 2019

(65) Prior Publication Data
US 2020/0386551 A1 Dec. 10, 2020

(51) Int. Cl.
| | |
|---|---|
| *G01C 21/02* | (2006.01) |
| *G01C 23/00* | (2006.01) |
| *G08G 5/00* | (2006.01) |
| *G01C 21/16* | (2006.01) |
| *G05D 1/10* | (2006.01) |

(52) U.S. Cl.
CPC ....... *G01C 21/025* (2013.01); *G01C 21/1656* (2020.08); *G01C 23/00* (2013.01); *G05D 1/101* (2013.01); *G08G 5/0008* (2013.01); *G08G 5/0021* (2013.01); *G08G 5/0086* (2013.01)

(58) Field of Classification Search
CPC .... G01C 21/025; G01C 23/00; G01C 21/165; G05D 1/101; G08G 5/0008; G08G 5/0078; G08G 5/0086; G08G 5/0021
See application file for complete search history.

(56) References Cited

U.S. PATENT DOCUMENTS

| | | | |
|---|---|---|---|
| 7,680,077 B1 | 3/2010 | Clark et al. | |
| 7,830,781 B2 | 11/2010 | Zogg et al. | |
| 2018/0284293 A1* | 10/2018 | Pan | G01S 19/45 |
| 2020/0025571 A1* | 1/2020 | Skilton | G01C 21/165 |

FOREIGN PATENT DOCUMENTS

DE   102013003588 A1 *  9/2014   ........... G01S 5/0072

OTHER PUBLICATIONS

Translation of DE102013003588 obtained via ESPACENET on Jul. 8, 2021 (Year: 2015).*

* cited by examiner

*Primary Examiner* — Jeffrey C Boomer
(74) *Attorney, Agent, or Firm* — Suiter Swantz pc llo

(57) ABSTRACT

A system and a method of determining an absolute position of a first vehicle can be used in restricted areas. The system performs operations of or the method includes receiving image data from a vision system mounted on a second vehicle, determining a first location of the second vehicle using at least positions of stars in the image data, providing the first location to the first vehicle, determining a first relative position between the first vehicle and the second vehicle using at least one signal communicated between the first vehicle and the second vehicle, and determining the absolute position using at least the relative location data and the first location.

2 Claims, 4 Drawing Sheets

MULTI-AIRCRAFT VISION AND DATALINK BASED NAVIGATION SYSTEM AND METHOD

CROSS REFERENCE TO RELATED APPLICATIONS

The present application is related to U.S. Ser. No. 10/210,648 filed on Jul. 31, 2002 entitled "Statistical Priority-Based Multiple Access System and Method" by Stephen M. Clark, Kelli A. Hoback, and Scott J. F. Zogg (now U.S. Pat. No. 7,680,077) and to U.S. Ser. No. 10/217,731 entitled "Waveform for Virtually Simultaneous Transmission and Multiple Receptions System and Method" by Scott J. F. Zogg, Stephen M. Clark, Richard S. Haendel, Ronald R. Meyer, and Brian L. Aanderud (now U.S. Application Publication No. 2004/0032878 and U.S. Pat. No. 7,830,781). The above applications are incorporated by reference herein in their entirety. All of the above applications are assigned to the assignee of the present application.

BACKGROUND

The inventive concepts disclosed herein generally relate to the field of navigation system and/or positioning systems including but not limited to navigation and/or positioning systems that use relative positioning techniques to determine location.

Navigation, targeting, and positioning systems, such as relative navigation systems, use relative positioning where a measure of the relative position between two objects is required or desired. For example, relative navigation systems utilize relative positioning to determine relative position between manned vehicles and/or unmanned vehicles (e.g., manned or unmanned aircraft (unmanned aerial systems (UASs)), drones, robots, land vehicles, marine vehicles, etc.). The relative position can be used in a variety of control and/or navigation operations including but not limited to: determining absolute position, providing warnings, station keeping, precision rendezvous, refueling, flying or driving in formation, automatically controlling an aircraft or other vehicle, locating targets, and performing evasive maneuvers.

Relative positions have been determined using active systems that sense position using transmitters that emit electromagnetic energy or other energy to sense position or using global positioning system (GPS) receivers. Some environments are not suitable for GPS receivers, and some applications of vehicles (e.g., a UAS or other aircraft) are non-emissive applications where active sensors and radio positioning cannot or should not be used. There is need to preserve vehicle operations in the case of denial of GPS operations or in environments where active position sensing and radio positioning is restricted or not available. There is also a need for a self-contained relative navigation capability that can operate in restricted environments, particularly for tactical operations (e.g., automated refueling of uninhabited combat air vehicles (UCAVs)).

SUMMARY

One aspect of inventive concepts disclosed herein relate to an apparatus for a first vehicle. The apparatus includes a star vision system configured to provide first data associated with the first vehicle in response to captured star positions. The apparatus also includes an inertial reference system configured to use the first data to provide a first absolute position of the vehicle and a first communication interface configured to provide a first communication to a second vehicle in the environment. The first communication includes the first absolute position and is capable of being used for relative positioning by the second vehicle. The first communication interface is also configured to receive a second communication from the second vehicle comprising a second position of the second vehicle. The apparatus also includes a relative positioning system configured to determine a relative position of the first vehicle to the second vehicle using the second communication.

Another aspect of inventive concepts disclosed herein relates to a method of determining an absolute position of a first vehicle. The method includes receiving image data from a vision system mounted on a second vehicle, determining a first location of the second vehicle using at least positions of stars in the image data, and providing the first location to the first vehicle. The method also includes determining a first relative position between the first vehicle and the second vehicle using at least one signal communicated between the first vehicle and the second vehicle, and determining the absolute position using at least the relative location data and the first location.

In some embodiments of the inventive concepts disclosed herein, the method includes one or more of the following operations: determining an update to the absolute position using vision data from a vision system mounted on the first vehicle and a terrain data base, providing the update to the absolute position from the first vehicle to the second vehicle, determining a second relative position between the first vehicle and the second vehicle; or providing an update to the first position using the update of the absolute position and the second relative position.

Another aspect of inventive concepts disclosed herein relates to an apparatus for a first vehicle. The apparatus includes a first vision system configured to provide a first vision position in an environment associated with the first vehicle in response to captured ground positions, an inertial reference system to use the first vision position to provide a first absolute position of the vehicle, a first communication interface configured to provide a first communication to a second vehicle in the environment and receive a second communication from the second vehicle. The second communication includes a second absolute position of the second vehicle, and the first communication includes the first absolute position and is capable of being used for relative positioning by the second vehicle. The apparatus also includes a relative positioning system configured to determine a relative position of the first vehicle to the second vehicle using the second communication.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or maybe represented schematically in the interest of clarity. Like reference numerals in the drawings may represent and refer to the same or similar element, feature, or function. In the drawings.

DETAILED DESCRIPTION

Figure 1:
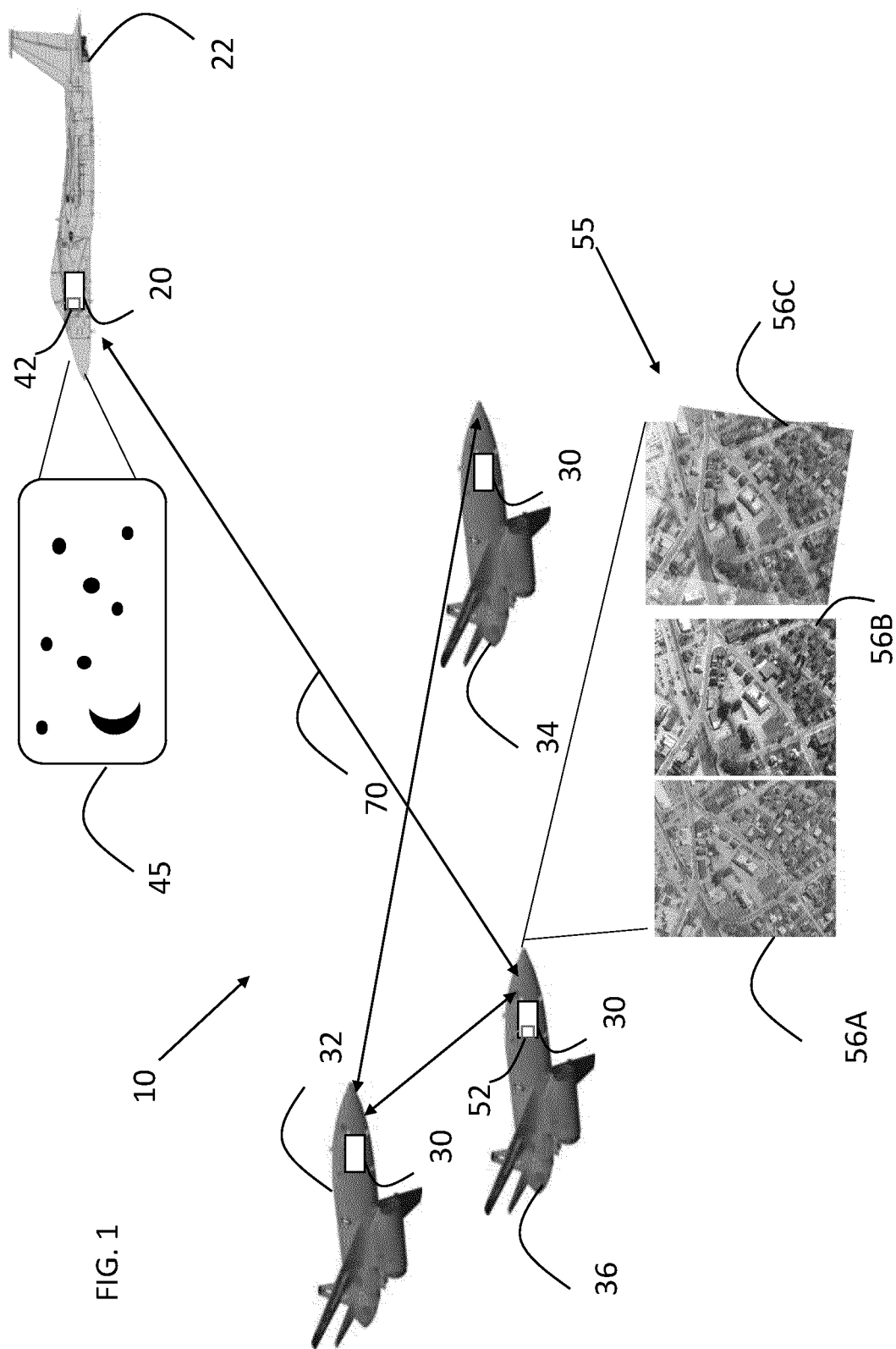
FIG. 1 is a schematic drawing of an environment including aircraft, with at least two aircraft including relative positioning systems according to certain inventive concepts disclosed herein.

Embodiments of inventive concepts disclosed herein are directed to passive positioning systems and methods for vehicles. In some embodiments, a first vehicle includes a star tracker and an internal reference system (IRS) or internal navigation system, and, a second vehicle includes a vision based terrain matching navigation system including of a camera directed toward terrain, and a database of geo-registered imagery. In some embodiments, a process can be performed as follows:

Step 1: A high flyer (e.g. the first vehicle) uses the star tracker to provide an update to an absolute position estimated by an onboard IRS. The update does not need to be in a form of a position, and can be in the form of line of sight angles to identified stars. The IRS processes this data to refine or update its absolute positions.

Step 2: The high flyer communicates its absolute position to the low flyer (e.g. the second vehicle) in a first communication.

Step 3: The low flyer determines its relative position with respect to the high flyer using the communication interface on the first communication.

Step 4: The low flyer uses the communicated absolute position of the high flyer from Step 2 and its own relative position with respect to the high flyer from Step 3 to estimate its own absolute position.

Step 5: The low flyer uses an estimate of its absolute position determined in Step 4 to initialize a search area for its onboard vision-based terrain matching navigation system.

Step 6: The vision based terrain matching navigation system onboard the low flyer finds a match of camera imagery to the terrain database within the search area defined in step 5.

Step 7: Using the match in Step 6, the low flyer determines a more accurate estimate of its absolute position compared to the absolute position determined.

Step 8: The low flyer uses the communication interface between itself and the high flyer to send the high flyer its refined absolute position estimate obtained in step 7.

Step 9: In a second communication, the high flyer determines relative position between itself and the low flyer.

Step 10: The high flyer uses relative position with respect to the low flyer obtained in Step 9 and absolute position of the low flyer received in step 8 to determine its own absolute position.

In some embodiments, Steps 8-10 are used only if the process yields a more accurate position information compared to a star tracker-aided IRS.

In some embodiments, the low flyer can send its absolute position estimate to a third vehicle, not only to a high flyer, using communication interface between these two vehicles (similar to Step 8) in a Step 11. In some embodiments, the third vehicle determines its position with respect to the low flyer using a communication interface between these two vehicles (the low flyer and vehicle 3) in a Step 12. In some embodiments, the third vehicle determines its absolute position using a relative position with respect to the low flyer from Step 12, and an absolute position of the low flyer communicated to the third vehicle in Step 11. The systems and methods provide relative position for operations including but not limited to: providing warnings, flying or driving in formation, automatically controlling an aircraft or other vehicle, locating targets, refueling and performing evasive maneuvers. The systems and methods determine relative position without emissions or with limited emissions in environments that are not suitable for GPS receivers in some embodiments.

The inventive concepts disclosed herein can be utilized in a number of control systems and/or display systems for various types of electronic avionics applications for vehicle platforms including but not limited to airborne platforms (e.g., aircraft), including but not limited to: flight control and autopilot systems, navigation systems, flight display systems, communications systems, radar systems, electric power systems, engine control systems, targeting systems, monitor systems, or warning systems. In some embodiments, a star tracker in a high flying vehicle locates a number of stars and identifies the stars using information stored in a star almanac (or database). The star tracker sends vectors (pointing angles) to the identified stars to the Inertial Navigation System (INS) on the high flying vehicle. The INS uses this information for a measurement update of its state vector, which includes its position, attitude, as well as other states such as gyro bias estimates. The high flying vehicle sends its absolute position information via a datalink to one or more low flying vehicles. Both the high and low flying vehicles are equipped with a relative navigation system, which allows each to determine its location with respect to the other (such as range, azimuth, and elevation). These relative navigation systems as described in U.S. Pat. Nos. 7,680,077 and 7,830,781 incorporated herein by reference in their entireties can be integrated into the datalinks on the low and high flying vehicles in some embodiments.

In some embodiments, the INS on the low flying vehicle receives information about location of the high flying vehicle, as well as relative position of the low flying vehicle with respect to the high flying vehicle in some embodiments. The relative navigation system also measures the precise transfer of time, thus all absolute and relative position measurements are accurately time stamped in some embodiments. The INS on the low flying vehicle combines this information to determine an estimate of its own absolute position. This estimate may be set, if, for example, the star tracker is not very accurate, or relative navigation is not accurate, or time transfer is not accurate in some embodiments.

In some embodiments, the INS on the low flying vehicle sends an estimate of its own absolute position and attitude (pitch, roll, heading) (e.g. derived from the absolute position of the high flying vehicle and the relative position between the first vehicle and the second vehicle) to a vision based navigation (VBN) system in some embodiments. The VBN system restricts the search region based on this information and matches terrain features captured by the VBN system with those in its terrain imagery database in some embodiments. The VBN system may use visible, or infrared spectrum light (the latter for night vision (e.g., long wave infrared works well both during day and night)) in some embodiments. The VBN system sends vectors (e.g., position, attitude) to the matched features to the INS, which uses this information for a measurement update in some embodiments. This operation allows the low flying vehicle INS to refine an estimate of its own absolute position, since VBN based on matching terrain features can be very accurate (down to single digit meters, on par with GPS) in some embodiments. The updated absolute position of the low flying vehicle can be sent to the high flying vehicle for updating the high flying vehicle's absolute position using relative positioning in some embodiments. The exchange of absolute position information can continue in a loop to provide continuous, serial updates in some embodiments In some embodiments, the systems and methods refine an estimate of the high flying vehicle location (if star tracker is not very accurate, but relative navigation, timing, and VBN are very accurate). To refine the estimate, the absolute position information from the INS of the low flying vehicle is provide to the high flying vehicle. The datalink on the high flying vehicle uses the absolute position and the relative position with respect to the low flying vehicle, as measured by the relative navigation system, to refine estimate of the high flying vehicle position (e.g., the state vector, which includes its position, attitude) which is fed into the high flying vehicle INS.

In some embodiments, the systems and methods are used in squadrons or swarms of manned aircraft and unmanned aircraft. Some aircraft in formation or a swarm may not be equipped with either star tracker or VBN. Such aircraft can advantageously use datalink based relative navigation obtain an estimates of their absolute position based upon absolute position from another aircraft including a star tracker or VBN.

While the present disclosure describes systems and methods implementable for an airborne platform, the inventive concepts disclosed herein may be used in any type of application or environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system). The inventive concepts disclosed herein may be used for training, simulation, and testing exercises to be performed with autonomous vehicles. In some embodiments, the systems are included in or communicatively coupled to an avionics system, navigation system, or autopilot system of the airborne platform, including for controlling operation of unmanned vehicles and autonomous vehicles. The systems and methods are provided as a primary or backup positioning system for use in contested environments in some embodiments.

With reference to FIG. 1, an environment 10 includes vehicles such as aircraft 22, 32, 34 and 36 (e.g., one or more UAS's, manned military aircraft, manned commercial aircraft, or other vehicle). The aircraft 22 is a high flying aircraft and the aircraft 32, 34, and 36 are low flying aircraft in some embodiments. The aircraft 22 includes a navigation system 20 capable of relative positioning which includes a vision based position system 42. The aircraft 36 includes a navigation system 30 capable of relative positioning which includes a vision based position system 52. The aircraft 32 and 34 include the navigation system 30 capable of relative positioning which may or may not include the vision based position system 42.

The vision based position system 42 is integrated with or separate from the navigation system 20 and is in communication with the navigation system 20. The vision based position system 42 uses image data 45 captured from one or more cameras of the vision based position system 42 to determine an absolute position of the aircraft 22. The image data 45 includes star and planetary data and the vision based position system 42 is a celestial position system (e.g., a star tracker system) in some embodiments. The star tracker system compares the captured image data 45 to known stellar and/or planetary positions to provide data (lines of sight data, position data, etc.) for use by the navigation system 20 to update an absolute position of the aircraft 22. In some embodiments, the brightest navigation stars (e.g., over 50) and the data associated with those stars from the United States Naval Observatory (e.g., a star field data base or star catalog stored on the aircraft 22) are used to determine the data which can be expressed as vectors (e.g., position, attitude, lines of sight, as well as other states). In some embodiments, the aircraft 22 flies above cloud cover to obtain a clear view of the celestial environment. In some embodiments, other landmark data as opposed to stellar data is used for determining the location of the aircraft 22.

The vision based position system 42 includes a camera or light sensor. The vision based position system 42 outputs raw data including pixels associated with a captured state of an environment. In some embodiments, frames of video data are provided by the vision based position system 42. The vision based position system 42 can be a visible camera system, ultraviolet camera system, an infrared camera system, a passive sensor array, or combinations thereof. In some embodiments, the vision based position system 42 includes one or more two dimensional charge-coupled device (CCD) arrays or complementary metal oxide semiconductor (CMOS) arrays. In some embodiments, the vision based position system 42 includes one or more shortwave infrared cameras capable of perceiving stars during the day. In some embodiments, the vision based position system 42 is a three dimensional vision system including two or more cameras have different fields of view. The vision based position system 42 allows positioning to be obtained without GPS, radio positioning, or other active sensing in some embodiments. In some embodiments, the vision based precision system provides accuracy of less than 20-40 meters.

The vision based position system 52 is integrated with or separate from the navigation system 30 and is in communication with the navigation system 30. The vision based position system 52 uses image data 55 captured from one or more cameras of the vision based position system 52 to data for use by the navigation system 30 to update an absolute position of the aircraft 36. The image data 55 includes one or more views 56A-B of a ground environment associated with the aircraft 32 in some embodiments. The vision based position system 52 compares the captured the image data 55 to known geographic data to determine the data for use by the navigation system 30. In some embodiments, the absolute position of the aircraft 22 with or without a relative poisoning adjustment related to the distance between the aircraft 36 and the aircraft 22 is used to provide a coarse estimate and a select a data sample of known local locations to reduce the computational load associated with the comparisons. The geographic locations include locations of natural and man-made landmarks in some embodiments. In some embodiments, the aircraft 36 flies below cloud cover to obtain a clear view of the ground environment.

The vision based position system 52 is a vision sensor or other passive sensor (e.g., a camera, or light sensor). The vision based position system 52 outputs raw data including pixels associated with a captured state of an environment within a sensor range of the vision based position system 52.

In some embodiments, frames of video data are provided by the vision based position system 52. The vision based position system 42 can be a visible camera system, ultra-violet camera system, an infrared camera system (e.g., long wave infrared), a passive sensor array, or combinations thereof for providing the views 56A-C. In some embodiments, the vision based position system 52 includes visible or infrared light cameras having overlapping fields of view (e.g., one to the left and one to the right) or light cameras operating in different wavelength bands. In some embodiments, the vision based position system 52 includes one or more two dimensional charge-coupled device (CCD) arrays or complementary metal oxide semiconductor (CMOS) arrays. In some embodiments, the vision based position system 42 is a three dimensional vision system including two or more cameras have different fields of view. Position based precision matching with a database of registered imagery (e.g., satellite maps or other imagery where for each pixel is associated with coordinates) can be used by the navigation system 30. In some embodiments, the position based precision matching can reach accuracy of less than 10 meters.

The navigation systems 20 and 30 use at least one absolute position as determined using data from at least one of the vision based position systems 42 and 52 and using relative position between the aircraft 36 and 22 to determine a more robust position without requiring GPS or other active sensing. The location of the aircraft 32 and 34 can similarly be determined by the navigation systems 30 using relative position data between the aircraft 22 and the aircraft 32 and 34 and the absolute position of the aircraft 22, using relative position data between the aircraft 36 and the aircraft 32 and 34 and the absolute position of the aircraft 36, or using relative position data between the aircraft 32 and 34 and the absolute position of one of the aircraft 32 and 34. The relative positioning is determined using communication signals on a communication link 70 as described in U.S. Pat. Nos. 7,680,077 and 7,830,781. In some embodiments, the communication signals are provided in accordance with the range between the aircraft 22 and 36 (e.g. are provided at a low power level appropriate for the range). The communications signals can be provided intermittently and with encryption and modulation techniques to avoid detection by non-authorized entities.

An aircraft control center can be configured for an aircraft operator or other user to view the position information associated with the navigation systems 20 and 30. The aircraft control center can include one or more flight displays that provide information to the flight crew. The information can include graphical depictions of the environment, the relative distances between the aircraft 22, 32, 34, and 36, and warnings based upon the relative distances in some embodiments. The information is provided to a controller or autopilot system for controlling the aircraft 22, 32, 34, and 36 in some embodiments. In some embodiments, the navigation system 20 and 30 provide a backup system if a GPS-based or active sensor-based system is unavailable, degraded or disabled.

Figure 2:
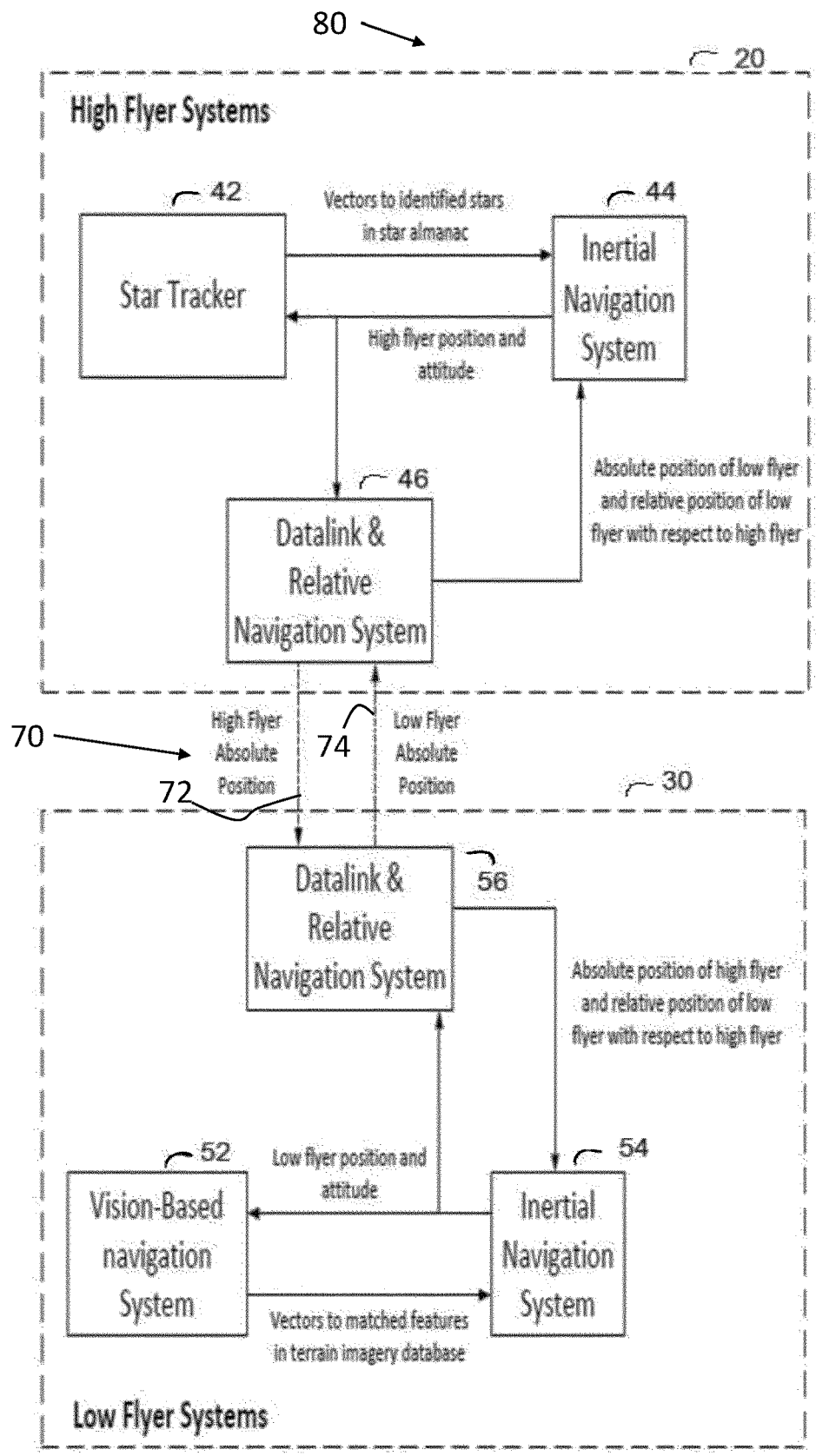
FIG. 2 is a schematic block diagram of the positioning system for a first aircraft illustrated in FIG. 1 and the positioning system for a second aircraft illustrated in FIG. 1 according to certain inventive concepts disclosed herein.

With reference to FIG. 2, a system 80 can be implemented using two or more vehicles, autonomous vehicles, or any other platforms, such as an airborne platform (e.g., the aircraft 22, 32, 34, and 36 of FIG. 1). The system 80 (or components thereof) can be implemented on a live platform or a simulation of a platform.

In some embodiments, the system 80 includes the navigation system 20 and the navigation system 30. The navigation system 20 includes the vision based position system 42, inertial navigation system 44, and a datalink and relative navigation system 46 in some embodiments. The navigation system 30 includes the vision based position system 52, an inertial navigation system 54, and a datalink and relative navigation system 56 in some embodiments. The datalink and relative navigation systems 46 and 56 include computer and communication equipment configured to communicate via the communication link 70 (e.g., equipment described in U.S. Pat. Nos. 7,680,077 and 7,830,781). The data link and relative navigation system 46 can provide the absolute position of the aircraft 22 to the data link 72 and relative navigation system 56 via a data link 74 of the communication link 70 in some embodiments. The data link and relative navigation system 56 can provide the absolute position of the aircraft 36 to the data link and relative navigation system 46 via a link 72 of the communication link 70 in some embodiments. The links 72 and 74 are a single wireless link in some embodiments. The signals associated with the communication of the absolute positions can be used for relative positioning or additional signals can be provided across the links 72 and 74 for relative positioning as described below.

Positions determined using the system 80 can be provided to supervisory controllers and a maneuver controller, a flight display, a failsafe controller, and an autopilot system. The systems and methods discussed in U.S. patent application Ser. No. 15/435,197, filed Feb. 16, 2017, incorporated herein by reference in its entirety, can utilize the positions determined using the system 80 in some embodiments.

The inertial navigation systems 44 and 54 determine absolute positions in response to previous absolute position, movement, and time. The absolute position can be a state vector, which includes its position, attitude, as well as other states such as gyro bias estimates. In some embodiments, the inertial navigation systems 44 and 54 include flight sensors including but not limited to altimeters, attitude reference systems, roll sensors, accelerometers, airspeed sensors, pitch sensors, and other flight parameters sensors. The absolute positions can be updated using relative navigation data.

In some embodiments, the inertial navigation system 44 receives data related to absolute position of the aircraft 22 from the vision based position system 42. The data can be vectors to identified stars in a star almanac in some embodiments.

In some embodiments, the inertial navigation system 44 updates the absolute position of the aircraft 36 using the data from the vision system 42 and a relative position between the aircraft 36 and 22 from the data link and relative navigation system 46. The inertial navigation system 44 can utilize absolute position of the aircraft 36 and a relative position between the aircraft 36 and 32 from the data link and relative navigation system 46 to determine absolute position of the aircraft 22. In some embodiments, the relative position includes one or more of relative ahead distance, relative left or right distance, relative roll position, relative pitch position, etc. In some embodiments, the inertial navigation system 44 can utilize various algorithms to combine the data from the vision based position system 42 and the data link and relative navigation system 46 to determine the absolute position. Kalman filtering, prioritization schemes, and weighting based upon timing, confidence, and source of data can be utilized to determine the absolute position in some embodiments. In some embodiments, the inertial navigation system 44 uses data internally generated by the inertial navigation system 44, the data from the data link and relative navigation system 46, and data from the vision based position system 42. The inertial navigation system 44 iteratively determines the absolute position using the data from any of the inertial navigation system 44 (internal), the data from the data link and relative navigation system 46, data from the vision based position system 42, previous determinations and combinations thereof in some embodiments.

In some embodiments, the inertial navigation system 54 absolute position of the aircraft 36 using data from the vision based position system 52. The data can be represented by vectors to identified landmarks in a terrain database in some embodiments, in latitude, longitude, and altitude used by position system 52.

In some embodiments, the inertial navigation system 54 updates the absolute position of the aircraft 36, using the data from the vision 22 and a relative from the position between the aircraft 36 and 32 from the data link and relative navigation system 56. The inertial navigation system 54 can utilize absolute position of the aircraft 22 and a relative position between the aircraft 36 and 32 from the data link and relative navigation system 56 to determine absolute position of the aircraft 36. In some embodiments, the inertial navigation system 54 can utilize various algorithms to combine the data for the vision based position system 52 and the data link and relative navigation system 56 to determine the absolute position. Kalman filtering, prioritization schemes, and weighting based upon timing, confidence, and source of data can be utilized to determine the absolute position in some embodiments. In some embodiments, the inertial navigation system 54 uses data internally generated by the inertial navigation system 54, the data from the data link and relative navigation system 56, and data from the vision based position system 52. The inertial navigation system 54 can iteratively determine the absolute position using the data from any of the inertial navigation system 54 (internal), the data from the data link and relative navigation system 56, data from the vision based position system 52, previous determinations and combinations thereof.

The system 80 can include computing hardware (e.g., control circuit, processing electronics) that include a processor and memory for implementing the vision based position systems 42 and 52, the inertial navigation systems 44 and 54 and the datalink and relative navigation systems 46 and 56. The processors may be implemented as one or more specific purpose processors, application specific integrated circuits (ASICs), field programmable gate arrays (FPGAs), groups of processing components, or other suitable electronic processing components. The memory is one or more storage devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

An exemplary process for the system 80 is as follows:

Step 1: The aircraft 22 uses the vision based system 42 (e.g., star tracker) to provide an update to an absolute position estimated by the inertial navigation system 44. The update does not need to be in a form of a position, and can be in the form of line of sight angles to identified stars. The inertial navigation system 44 processes this data to refine or update its absolute positions.

Step 2: The datalink and relative navigation system 56 of the aircraft 22 communicates its absolute position to the aircraft 32 in a first communication on the communication link 72.

Step 3: The aircraft 36 determines its relative position with respect to the aircraft 22 using the datalink and relative navigation system 56 and communication on the communication link 72.

Step 4: The inertial navigation system 54 of the aircraft 36 uses the communicated absolute position of the aircraft 22 from Step 2 and its own relative position with respect to the aircraft 22 from step 3 to estimate its own absolute position.

Step 5: The inertial navigation system 54 of the aircraft 36 uses an estimate of its absolute position determined in step 4 to initialize a search area for the vision based navigation system 52.

Step 6: The vision based navigation system 52 (e.g., vision based terrain matching navigation system) onboard the aircraft 36 finds a match of camera imagery to the terrain database within the search area defined in step 5.

Step 7: Using the match in step 6, the inertial navigation system 54 of the aircraft 36 determines a more accurate estimate of its absolute position compared to the absolute position determined in Step 4.

Step 8: The datalink and relative navigation system 56 of the aircraft 36 uses the communication link 74 to send the aircraft 22 its refined absolute position estimate obtained in Step 7.

Step 9: The datalink and relative navigation system 46 of the aircraft 22 determines relative position between the aircraft 22 and the aircraft 36.

Step 10: The inertial navigation system 44 of the aircraft 22 uses relative position with respect to the aircraft 36 obtained in Step 9 and absolute position of the aircraft 36 received in Step 8 to determine the absolute position of the aircraft 22. In some embodiments, steps 8-10 are used only if the process yields a more accurate position information compared to a star tracker-aided IRS.

Step 11: The datalink and relative navigation system 56 of the aircraft 36 sends its absolute position estimate to one of the aircraft 32 and 34, using communication interface.

Step 12: The aircraft 32 or 34 determines its position with respect to the aircraft 36 using the communication interface between these aircraft. In some embodiments, the aircraft 34 and 36 determines their absolute position using a relative position with respect to the aircraft 36, and an absolute position of the aircraft 36 communicated to the aircraft 34 and 36 in step 11.

The steps above are optional in some embodiments and can be performed in different order in some embodiments.

Figure 3:
FIG. 3 is a display showing exemplary data related to star position for the positioning system for the first aircraft illustrated in FIG. 1 according to certain inventive concepts disclosed herein.

With reference to FIG. 3, a display 300 shows a captured image of a stellar environment. The vision based position system 42 (FIGS. 1 and 2) can utilize data associated with the captured image including time of capture, estimated errors, and star locations to derive data for determining an absolute position of the aircraft 22.

Figure 4:
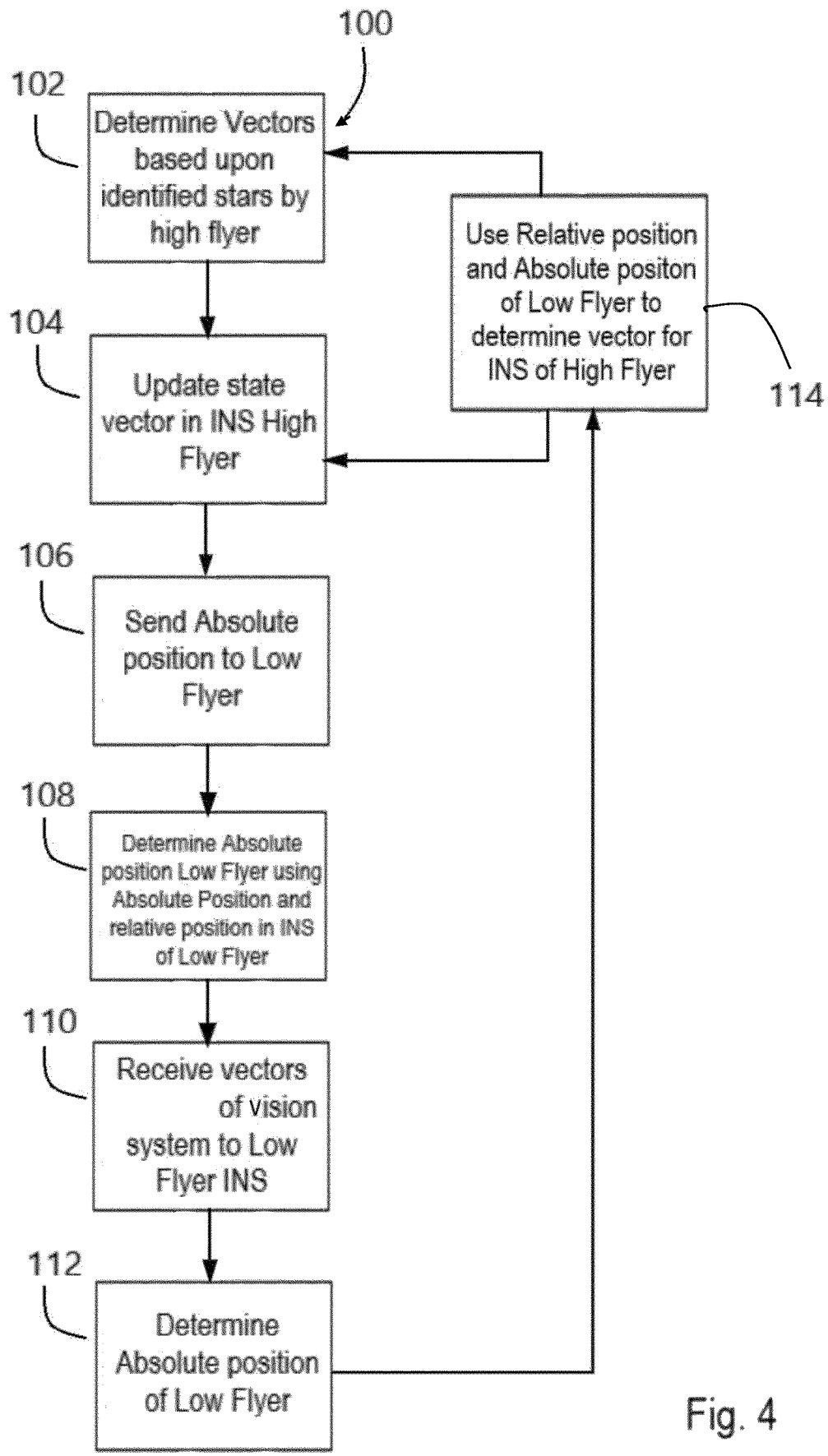
FIG. 4 is a flow diagram of operations performed by the positioning systems illustrated in FIGS. 1 and 2, according to certain inventive concepts disclosed herein.

With reference to FIGS. 2 and 4, a flow 100 of exemplary operations for the system 80 includes an operation 102 where the vision based position system 42 captures an image of a stellar environment and determines vectors for a high flying vehicle such as the aircraft 22 based upon star position in some embodiments. At an operation 104, the vectors are updated in the inertial navigation system 44 using relative position between the aircraft 22 and the aircraft 36 and absolute position of the aircraft 36 determined in an operation 114. In some embodiments, the operations 104 and 102 are not performed in certain stages of the flow 100 or not performed at all.

Relative positioning is determined using synchronized clock signals and time ranging in some embodiments. In some embodiments, other techniques such as radar sensing can determine the relative positioning. The radar positioning determines the relative angle and elevation between the two aircrafts which allows a vector or other coordinate system definition of relative position to be defined.

In an operation 106, an absolute position of the aircraft 22 is sent from the datalink and relative navigation system 46 to the datalink and relative navigation system 56. In an operation 108, the inertial navigation system 54 determines the absolute position of the low flying vehicle (e.g., aircraft 36) using the absolute provided in the operation 106 and the relative position between the aircraft 22 and the aircraft 36. At an operation 110, the vision based position system 52 captures an image of a ground environment and determines vectors for a low flying vehicle such as the aircraft 36 based upon geographic landmarks in some embodiments. In an operation 112, an absolute position of the aircraft 36 is determined by the inertial navigation system 54 using the absolute position from the operation 108 and the vector determined in the operation 110. After operation 112, the flow 100 can return to the operation 102. 114, or 104.

At the operation 114, the absolute position of the aircraft 22 is determined using the absolute position determined in the operation 112 provided from the data link and relative navigation system 56 to the data link and relative navigation system 46 and the relative position between the aircraft 36 and 22. The flow 100 can be repeated with solutions iteratively applied for increased accuracy.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A method of determining an absolute position of a second vehicle, the method comprising:

receiving, on an inertial reference system on a first vehicle, image data from a vision system mounted on the first vehicle;

determining, on the inertial reference system on the first vehicle, an absolute position of the first vehicle using at least positions of stars in the image data;

providing, from the first vehicle to a relative navigation system on the second vehicle, at least one signal capable of being used to determine relative positioning, wherein the relative navigation system on the second vehicle is capable of determining a relative position of the second vehicle in respect to the first vehicle by virtue of the first vehicle providing the at least one signal to the relative navigation system on the second vehicle, the at least one signal including at least the absolute position of the first vehicle;

determining, on the relative navigation system on the second vehicle, a first relative position between the first vehicle and the second vehicle using the at least one signal;

determining, using an inertial reference system on the second vehicle, an absolute position estimate of the second vehicle using at least the first relative position and the absolute position of the first vehicle;

providing the absolute position estimate of the second vehicle to a vision based navigation (VBN) system on the second vehicle comprising the vision system mounted on the second vehicle;

restricting a search region of a terrain imagery database using the VBN system, wherein the restricting is based upon the absolute position estimate of the second vehicle;

matching a terrain imagery within the search region with a vision data captured by the vision system, the vision data comprising geographic features; and determining an update to the absolute position estimate of the second vehicle based upon the matching of the terrain imagery with the vision data.

2. The method of claim 1, further comprising:

providing the update to the absolute position estimate of the second vehicle, from the second vehicle to the first vehicle;

providing a at least one second signal from the first vehicle to the relative navigation system on the second vehicle, wherein the at least one second signal is capable of being used for relative positioning by the second vehicle;

determining a second relative position between the first vehicle and the second vehicle, by use of the relative navigation system on the second vehicle, and by virtue of the second vehicle receiving the at least one second signal capable of being used for relative positioning; and determining an update to the absolute position of the first vehicle using the update of the absolute position estimate of the second vehicle and the second relative position.

* * * * *